United States Patent [19]
Adamson et al.

[11] Patent Number: 5,135,185
[45] Date of Patent: Aug. 4, 1992

[54] WING MOUNTED UNDUCTED FAN ENGINE

[75] Inventors: Arthur P. Adamson, Cincinnati; Wu-Yang Tseng, West Chester, both of Ohio

[73] Assignee: General Electric Company, Cincinnati, Ohio

[21] Appl. No.: 703,720

[22] Filed: May 22, 1991

Related U.S. Application Data

[63] Continuation of Ser. No. 207,796, Jun. 17, 1988, abandoned.

[51] Int. Cl.$^5$ ............................................. B64D 27/00
[52] U.S. Cl. ....................................... 244/55; 244/65
[58] Field of Search .................... 244/53 R, 55, 62, 65, 244/69, 130; 415/208, 216

[56] References Cited

U.S. PATENT DOCUMENTS

| | | | |
|---|---|---|---|
| 1,980,233 | 11/1934 | Stout | 244/55 |
| 2,242,198 | 5/1941 | Woods | 244/55 |
| 2,395,513 | 2/1946 | Stalker | 244/40 |
| 2,397,526 | 4/1946 | Bonbright | 244/55 |
| 2,402,311 | 6/1946 | Bissett | 244/13 |
| 2,604,276 | 7/1952 | Huben | 244/15 |
| 4,311,289 | 1/1982 | Finch | 244/55 |
| 4,318,516 | 3/1982 | Cole | 244/55 |
| 4,533,101 | 8/1985 | Patterson | 244/199 |
| 4,629,147 | 12/1986 | Johnson et al. | 244/55 |

FOREIGN PATENT DOCUMENTS

| | | |
|---|---|---|
| 0186220 | 2/1986 | European Pat. Off. |
| 592220 | 9/1947 | United Kingdom. |
| 2129502 | 5/1984 | United Kingdom. |
| 2138507 | 10/1984 | United Kingdom. |
| 2203710 | 10/1988 | United Kingdom. |

OTHER PUBLICATIONS

Batchelor, "An Introduction to Fluid Mechanics", 1967 (plate 7).

Primary Examiner—Galen Barefoot
Attorney, Agent, or Firm—Jerome C. Squillaro; David L. Narciso

[57] ABSTRACT

An aircraft engine is mounted on an aircraft wing such that the wing wake sheds along a zone at a predetermined position on the engine disk thereby minimizing dynamic loads or resonance. For a prechosen or design set of engine conditions the strength of the dynamic load is a function of the radial location of the zone on the disk having at least one relative minima between the centerline and the perimeter of the disk. The zone is positioned on the disk such that the value of the function is essentially a relative minima.

26 Claims, 4 Drawing Sheets

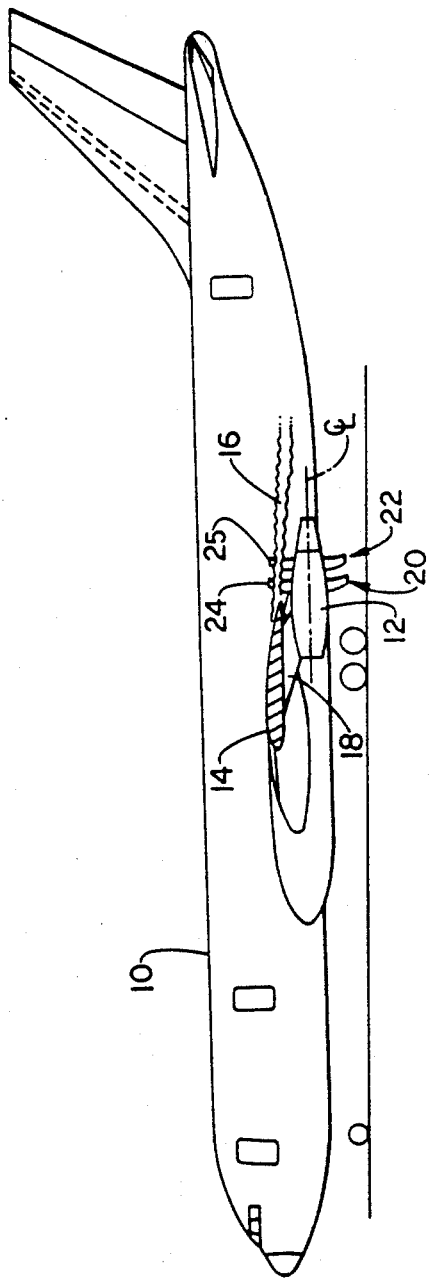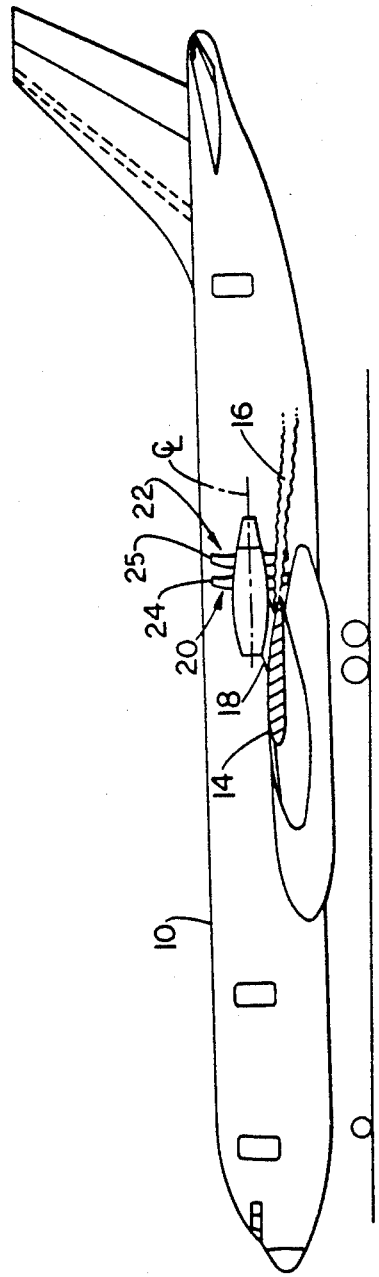

WING MOUNTED UNDUCTED FAN ENGINE

This application is a Continuation of application Ser. No. 07/207,796, filed Jun. 17, 1988, abandoned.

BACKGROUND OF THE INVENTION

Modern gas turbine engine technology has reached a point where highly efficient large prop and fan engines characterized by bypass ratios of 30 and higher are being designed and built. A pioneering example of this type of engine is General Electric Unducted Fan or UDF ™ engine as it is known in the aircraft engine industry. This type of engine, often referred to as an ultra high bypass ratio engine, may also be characterized by counter rotating fans or props having high disc loading in a range upwards of 30 horsepower per square foot. A particular arrangement for mounting this type of engine is a wing mounted pusher engine where the fan blades or props are located directly behind the wing of the aircraft. In the case of the GE UDF engine, the fan blades are often mounted at or near the rear of the engine and at or near the perimeter of the nacelle. A problem encountered by pusher engines is the interaction between the wing wake and the fan or prop blades as it effects the operation and structural integrity of the engine. Ideally, one would prefer that the wing wake not shed on the disk of the engine at all, however this cannot be avoided with a wing mounted engine aircraft. The disk is defined by a radius drawn from the center of the engine to the tip of the fan or prop blade. It is desirable to mount the engine behind the wing at an appropriate height above the ground to avoid having the blade tip hit the ground on takeoff yet sufficiently low enough to avoid an unfavorable engine mass and thrust vector location. Ideally, from a structural standpoint, one would like to mount the engine as close to the wing as possible. However such a design allows the wing wake to be shed onto the disk of the engine causing a a 2 per rev dynamics problem increasing blade stress. The present invention minimizes and alleviates the stress.

OBJECTS OF THE INVENTION

It is a present object of the invention to provide a modern fuel efficient aircraft with a pusher type high bypass ratio gas turbine engine.

It is another object of the invention to reduce the vibratory stresses on the propulsor blades of a pusher type gas turbine engine.

It is another object of the invention to provide an efficient low load mounting arrangement for a very high bypass ratio engine.

It is yet a further object of the invention to provide a modern fuel efficient aircraft with a wing mounted pusher type high bypass ratio gas turbine engine.

SUMMARY OF THE INVENTION

An aircraft propulsion system comprising a pusher type engine including propulsor blades and an engine mounting means which minimizes the 2 per rev excitation of said Propulsor blades due to a wake interaction with said propulsor blades. One embodiment is an aircraft engine comprising a plurality of propulsor blades which define an engine disk; a wake interaction zone across the disk having a radial location on the disk; wherein the relative strength of the dynamic loads acting on said blades is a function of the radial location having at least one relative minima along the blade length; and the location is such that the value of the function is essentially a relative minima. A more particular embodiment is a wing mounted pusher aircraft engine comprising a plurality of propulsor blades which define an engine disk; a wake interaction zone across the disk having a radial location on the disk wherein the wake is shed from the aircraft's wing; wherein the relative strength of the dynamic loads acting on said blades is a function of the radial location having at least one relative minima along the blade length; and the location is such that the value of the function is essentially a relative minima.

BRIEF DESCRIPTION OF THE DRAWINGS

FIG. 1 is a side view of an aircraft incorporating one embodiment of the present invention with the center of the engine below the wing.

FIG. 2 is a side view of an aircraft incorporating a second embodiment of the present invention with the center of the engine above the wing.

DESCRIPTION OF THE PREFERRED EMBODIMENT

Figure 5:
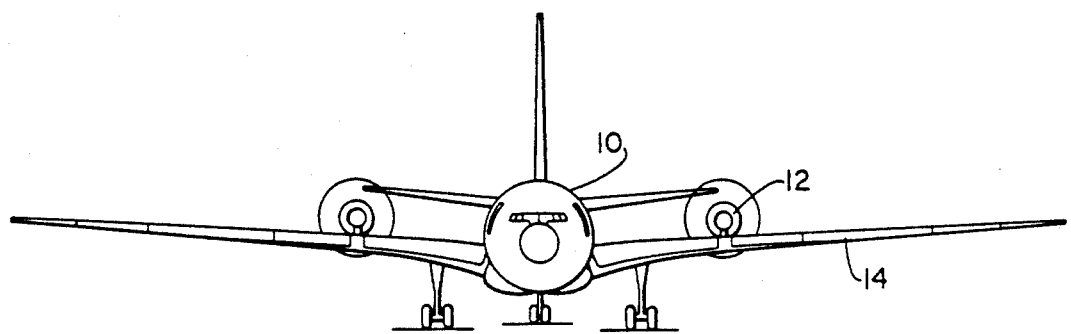
FIG. 5 is a front view of the aircraft shown in FIG. 2.
Figure 6:
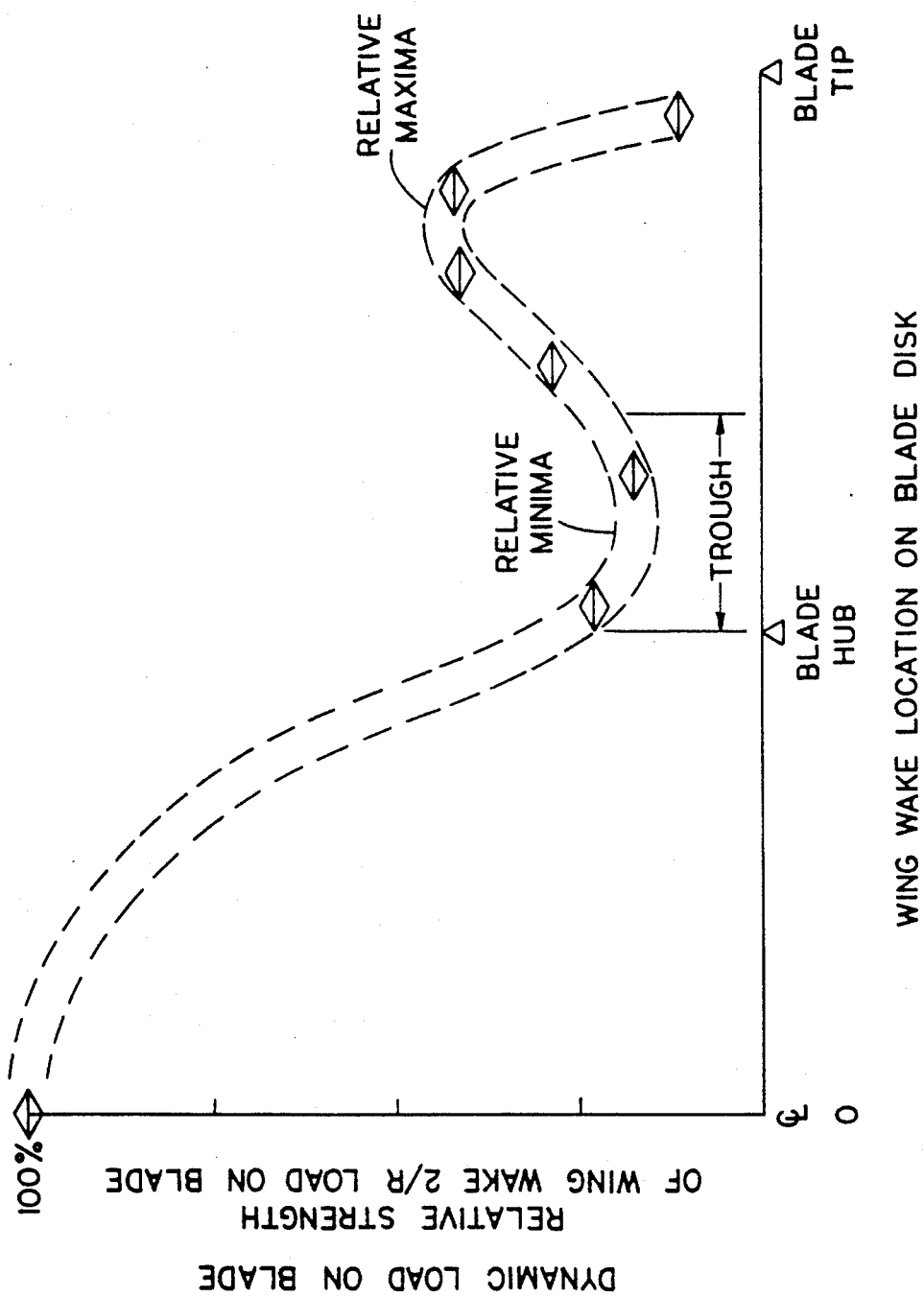
FIG. 6 is an exemplary graph describing the relationship of the dynamic loads, due to a wake, acting on the propulsor blades as a function of the location of the position at which the wake sheds on the engine disk.
Figure 7:
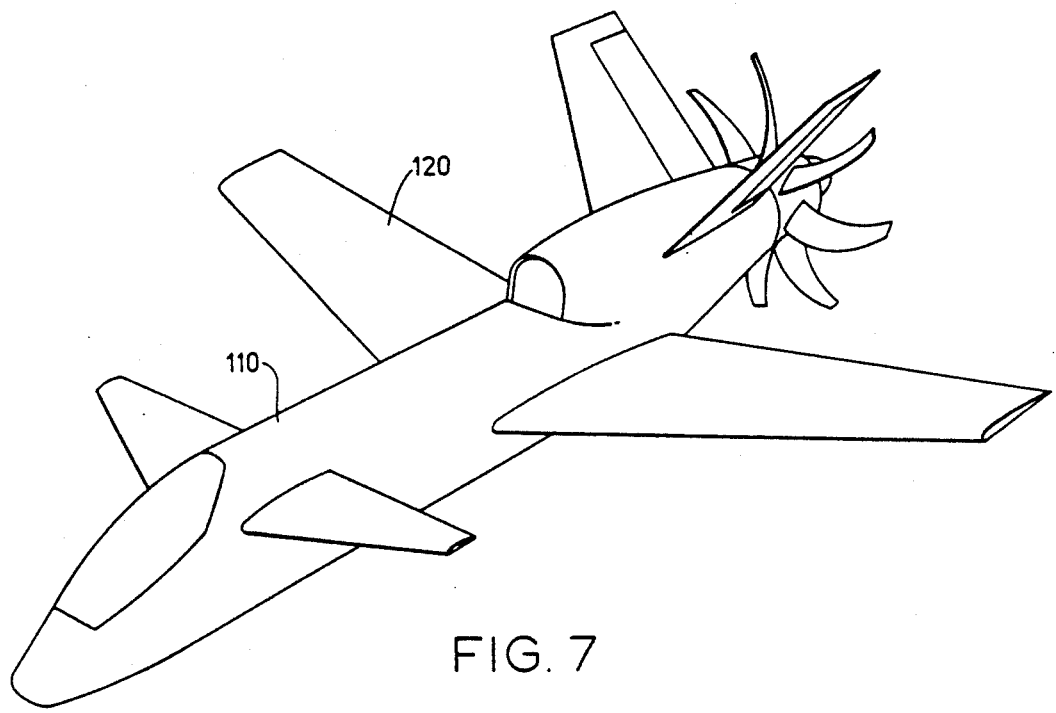
FIG. 7 depicts an aircraft incorporating a fuselage mounted engine and yet another embodiment of the present invention.
Figure 8:
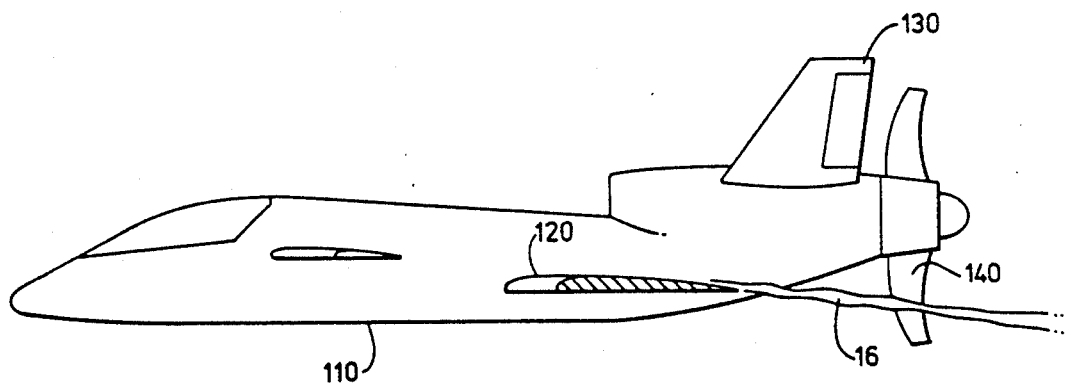
FIG. 8 is a side view of the aircraft in FIG. 8 and particularly points out the wake interaction with the propulsor blades.

The following description which refers to FIGS. 1–8 describes an aircraft and a wing mounted pusher aircraft engine in accordance with the preferred embodiment of the present invention. Although the engine shown is a wing mounted counter rotating unducted fan engine it is to be understood that the invention applies to many other types of engines employing fans or propellers and which may be referred to as props or blades. The engine may also be other than wing mounted such as side mounted on a pylon or fuselage mounted as is shown in FIGS. 7 and 8 and described later herein. The wake in these other cases may be due to pylons, wings, or aerodynamic control airfoils such as tails or stabilizers or a combination of wake generating elements.

FIG. 1 shows an aircraft 10 having an unducted fan engine 12 mounted on the wing 14 of aircraft 10. The engine 12 is mounted to wing 14 by pylon 18 or some other suitable engine mounting means. Engine 12 comprises a forward and aft counterrotating fan blade rows 20 and 22 respectively. Forward and aft blade rows 20 and 22 comprise forward and aft blades 24 and 25 respectively which are conventionally referred to as propulsor blades or props. Engine 12 is mounted with respect to wing 14 such that a wing wake 16 sheds on a top portion of the forward blade row 20. For the sake of convention this configuration will hereinafter be referred to as the below the wing mounting or configuration. The engine centerline will probably, depending on the geometry of the engine and wing, lie below the wing.

FIG. 2 shows an unducted fan engine 12 mounted on an aircraft 10 similar to the aircraft in FIG. 1 but wherein the engine is mounted such that the wing wake 16 sheds on the bottom of the disk and the engine centerline may, though not necessarily, lie above the wing. This arrangement allows for greater ground clearance or longer blades on the engine. Engine 12 has front and aft rows of counterrotating fan blades 20 and 22 respectively. The engine 12 is mounted to wing 14 by pylon 18 or some other suitable engine mounting means. This configuration causes the wing wake 16 to shed on the bottom portion of forward blade row 20. Again, for the sake of convention this configuration will hereinafter be referred to as the above the wing mounting or configuration.

Figure 3:
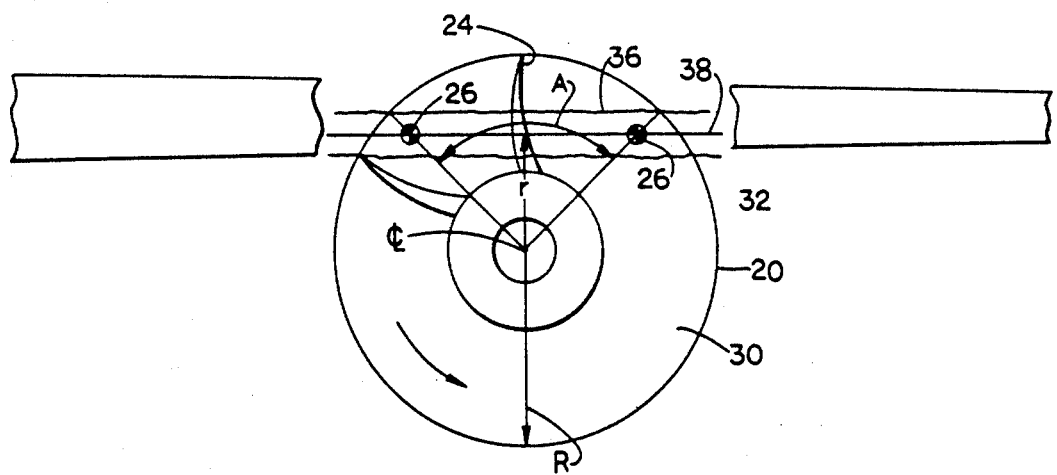
FIG. 3 is a diagrammatical front view of the disk of an engine incorporating one embodiment of the present invention.

FIG. 3 shows a disk 30 having a perimeter 32 defined by a radius R drawn from the engine centerline $C_L$ to the tip of the blade 22. A disk is an annular area swept out by the propulsor blade 22 and commonly used by engine designers to analyze propulsor blade performance. In this embodiment engine 12 is mounted to wing 14 in the below the wing configuration. The wing wake 16, shown in FIG. 1, sheds along a zone 36 on disk 30. The radial position of zone 36 is defined by the zones centerline 38 which usually corresponds to a chord of the perimeter. The centerline is one parameter used to define the position of the wake interaction zone 36. Other parameters or features may be used to define the radial location of the wake interaction zone on disk 30. The centerline's radial position r may be expressed in the form r/R. According to the present invention the engine is positioned such that the wing wake also sheds on the disk along zone 36 for a predetermined flight condition or mode, preferably cruise. The position of the wing wake may also be expressed in terms of a central angle A which exists between the blade positions at which the blades experience maximum dynamic loads due to the wing wake shedding on the disk as the blades rotate. The blade 24 includes a point 26 along the blade radius R which is the center of force of the force due to the wake. The same force will occur twice during each revolution of the blade and the two blade positions can be defined by a central angle A. Central angle A has a Preferred value of about 90 degrees in order to minimize the effects of 2 per revolution excitation or resonant frequency.

Figure 4:
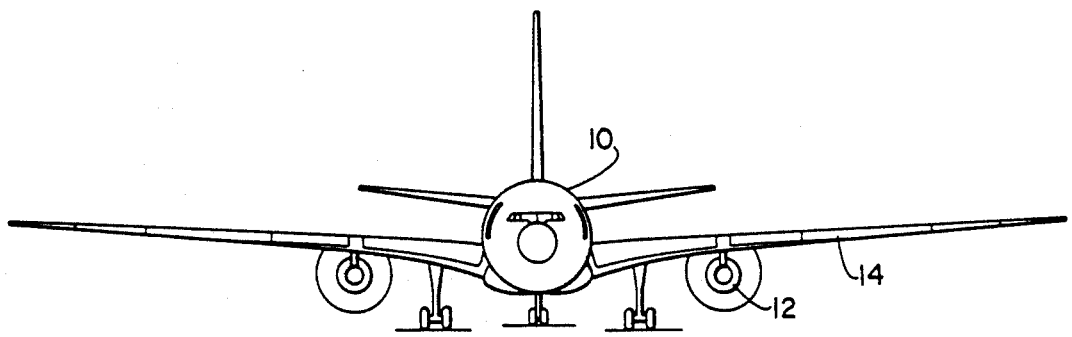
FIG. 4 is a front view of the aircraft shown in FIG. 1.

FIG. 4 is a forward view of the aircraft 10 which shows the position of the engine 12 and its disk 30 in accordance with the embodiment shown in FIG. 1 with respect to the wing wake 16 shed by wing 14. The disk 30 is defined by the forward blades 20 with respect to an engine centerline 32. This particular embodiment of the invention is generally referred to as an under the wing mounted engine.

FIG. 5 is a forward view of the aircraft 10 which shows the position of the engine 12 and its disk 30 in accordance with the embodiment shown in FIG. 2 with respect to the wing wake 16 shed by wing 14. The disk 30 is defined by the forward blades 20 with respect to an engine centerline 32. This particular embodiment of the invention is generally referred to as an over the wing mounted engine.

FIG. 6 is an exemplary graph depicting the relative strength of the forces acting on the blade due to resonance for a two per revolution (2 per rev) frequency as a function of the radial position r/R of the centerline 38 of wake interaction zone 36. The dynamic loads or forces shown in the graph are plotted as a function of the radial location r/R. The parameter r is measured from the engine centerline along the disk radius R to where it bisects the centerline 38 of the of the wake interaction zone 36. These forces may also be described as oscillatory, vibratory, or dynamic forces. The dynamic forces due to 2 per rev excitation, as depicted in FIG. 6, is minimized because it is usually predominant due to its nearness to blade resonance. The force as depicted in the graph in FIG. 6 is normalized by the maximum force that the blade experiences which in this particular embodiment is the force measured or predicted for a radial location of zero (r/R=0). The radial location r is normalized by the disk radius R thereby having an r/R range of 0-1.

In operation the wing sheds a wake 16, as depicted in FIGS. 1 and 2, upon the forward blades 20 of engine 12. A forward view of engine 12 shown in FIG. 3 shows the disk 30 and its zone of interaction 36 upon which the wake sheds. Disk is a common term used in propulsion in analyzing blade aerodynamics. The wake is a velocity anomaly which causes the blades 24 to experience a sudden velocity differential which causes a change in the force acting upon it. Because the change in force is encountered at least twice every revolution or cycle it is cyclic and at some frequencies may cause very high dynamic loads. The inventor has found that the relative strength of load is a function of where the wake interaction zone 30 lies on the disk and can be minimized by properly designing the engine with regard to the location of the zone. The relative strength of the wing wake load due to wake excitation, hereinafter referred to as the load, can be determined with a variety of methods. The loads can be determined by empirical, semi-empirical, or analytical methods and described as a function of the radial location r along a radius R which is normal to and bisects the centerline 38 as shown in FIG. 3. For the sake of brevity this will hereinafter be referred to as the wake or wing wake location. A typical function is depicted in FIG. 6 for which the strength of the load has been normalized by the value of the maximum predicted load and is denoted as a percentage of the maximum load and the wing wake location r is normalized by the disk radius R. The load distribution or function in FIG. 6 is a calculated or predicted load due to a 2 per rev excitation. As can be seen in FIG. 6 the function has a relative minima which occurs between the engine centerline and blade tip or disk perimeter. In one embodiment of the invention for an engine design condition including an aircraft velocity of about 800 ft/sec and an aircraft engine rotational velocity of about 1272 RPM the preferred location is about 3/5's of the distance from the engine centerline, i.e., r/R=3/5. By choosing a design which places the wake on the disk at a point for which the strength function is a relative minima one can operate the engine in a relatively broad range of off design conditions and still prevent large increase in the dynamic loads that the blade experiences. This is because the engine operates within the trough or bucket that is about the minima.

Alternative embodiments include engines where it is preferable to design the engine so that the function is approximately a relative minima. Through the flight envelope, as conditions change, the zone 36 will move radially inward or outward then the function will have a value that changes by decreasing and going through the relative minima point and any excursions higher will be minimized. It is even conceivable that the function may have a a value substantially higher than the minimal so that during engine operation the loads are always less than the design condition. The design of the present invention which allows the engine to operate in the trough about the relative minima of the function provides many advantageous modes of operating over a relative broad range of operating conditions while minimizing the strength of the dynamic loads acting on the blades of the disk. Being able to operate in such a bucket surrounding the relative minima allows the designer to have more flexibility in where he places the engine for a wide variety of aircraft and engine missions and flight conditions and increased structural reliability.

One may ask why not design the engine so as to have the wake shed so as to completely miss the disk. Theoretically this may be possible but from an aircraft design standpoint this may not be possible due to weight, load and aircraft dynamics consideration. This invention is for engines that because of design considerations must have a wake interaction zone on the disk. This is particularly true for high bypass ratio engines such as the GE UDF ™ and other energy efficient propfan designs.

The method of calculating values to define the function is known in the field but the method of using the function to design the mounting for the engine is another embodiment of the present invention. The method includes the following steps:

1. calculate the dynamic loads on the blade as a function of the radial location of the wing wake interaction zone on the disk,
2. determine a relative minima for the dynamic load function, and
3. position the engine such the location of the zone occurs at the bottom of the trough of the relative minima for a chosen set of design conditions.

The preferred method of calculating the load function is an analytical method including the assuming the following flight or design operating conditions:
1. a wing wake interaction zone on the disk having a width equal to ten percent of the blade span,
2. a twenty percent velocity deficit in the zone,
3. an aircraft velocity of 800 ft/sec, and
4. a rotational velocity of 1272 RPM.

The below the wing configuration, depicted in FIG. 1 and FIG. 6, is advantageous from an engine overhaul and maintenance standpoint whereas the above the wing configuration, depicted in FIG. 2 and FIG. 5, is advantageous for reducing foreign object digestion or FOD as it is conventionally referred to and for reducing hazards to ground personnel.

FIGS. 7 and 8 depict another particular embodiment of the invention, one in which the engine 90 is mounted in the fuselage 110 of aircraft 100. The wake is shown as being shed from the wing 120 but one can see how wakes generated by the tail or stabilizer 130 of aircraft 100 may shed on the propulsor blade 140. In a case such as this the wake interaction zone may be more complicated but yet subject to the same type of analysis and design as explained previously. It is possible that more than one wake interaction zone may lie on the disk, in which case the analysis and criteria for positioning of the wake interaction zones may apply to excitations other than 2 per rev and is essentially the same as previously described. This particular embodiment includes a single set of propulsor blades as opposed to the previous examples which described two sets or stages of propulsor blades.

It will be clear to those skilled in the art that the present invention is not limited to the specific embodiments described and illustrated herein. Nor is the invention limited to counterrotating unducted fan gas turbine engines or propfan engines as they sometimes referred to.

It will be understood that the relative dimensions and proportional and structural relationships shown in the drawings are illustrated by way of example only and those illustrations are not to be taken as the actual dimensions or proportional structural relationships used in the construction of the present invention.

Numerous modifications, variations, and full and partial equivalents can be undertaken without departing from the invention as limited only by the spirit and scope of the appended claims.

What is desired to be secured by Letters Patent of the United States is the following.

We claim:

1. An aircraft propulsion system comprising: a pusher type engine including propulsor blades and an engine mounting means for positioning said engine with respect to an aircraft for a cruise flight condition such that a wing wake sheds on an aerodynamic disk of radius R defined by said propulsor blades, with a wake interaction zone centerline normal to and bisected by a radius r defining the radial location of the zone on the disk, normalized by the ratio z/R, so as to produce dynamic loads in said blades from a 2 per rev excitation of said propulsor blades due to a wake interaction with said propulsor blades and wherein said dynamic loads have a relative strength as a function of the radial location r/R on the disk with a maximum strength at O and a relative minimum between 0 and 1, said mounting means positioning said propulsor blades so as to minimize the dynamic loads from the 2 per rev excitation of said propulsor blades due to a wake interaction with said propulsor blades by placing the wake at the relative minima, wherein said ratio of r/R is approximately 3/5.

2. An aircraft propulsion system as recited in claim 1 wherein said engine is wing mounted.

3. An aircraft propulsion system as recited in claim 1 wherein said engine is fuselage mounted.

4. An aircraft propulsion system as recited in claim 2 wherein said engine includes an engine centerline positioned below the wing.

5. An aircraft propulsion system as recited in claim 2 wherein said engine includes an engine centerline positioned above the wing.

6. A wing mounted aircraft engine comprising:
a plurality of propulsor blades which define an engine disk;
for a cruise flight condition, a wing wake interaction zone on said disk;
a zone midline which is normal to and bisected by a radius of said disk, wherein said midline defines the radial location of said zone; and
wherein for said cruise flight condition said radial location is such that a first maximum dynamic load on said propulsor blade due to wing wake interaction occurs about 90 degrees apart on said disk from a second maximum dynamic load during a single revolution of said blade.

7. A wing mounted pusher aircraft engine comprising:
a plurality of propulsor blades which define an engine disk;

for a cruise flight condition, a wake interaction zone on said disk wherein the wake form the aircraft's wing sheds on said disk;

a zone midline which is normal to and bisected by a radius of said disk, wherein said midline defines the radial location of said zone; and wherein for said cruise flight condition there is a maximum dynamic load on said propulsor blade due to wing wake interaction on said disk at a radial location of 0 and a relative minima dynamic load at about 0.6 of the disk radius, and the radial location of said zone is set at said relative minima.

8. An aircraft engine as recited in claim 7 wherein said engine has a bypass ratio of 30 or greater.

9. An aircraft engine as recited in claim 7 wherein said engine includes at least two counterrotating propulsor blade rows.

10. An aircraft engine as recited in claim 9 wherein said engine includes unducted counterrotating propulsor blade rows.

11. An aircraft engine as recited in claim 7 wherein said engine includes unducted propulsor blades.

12. An aircraft engine as recited in claim 7 wherein said disk has a disk loading range of 30 horsepower per square foot and higher.

13. A wing mounted pusher aircraft engine comprising:

a plurality of propulsor blades which define an engine disk;

for a cruise flight condition, a wake interaction zone having a radial location on said disk wherein the wake from the aricraft's wing sheds on said disk;

wherein the relative strength of the dynamic loads acting on said blades is a function of said radial location for said cruise flight condition having a maximum at a radial location of O and at least one relative minima along said blade length at about 0.6 of said propulsor blade length ;and said length is such that the value of said function is essentially a relative minima for said cruise flight condition.

14. An aircraft engine as recited in claim 13 wherein said engine has a bypass ratio of 30 or greater.

15. An aircraft engine as recited in claim 13 wherein said engine includes counterrotating propulsor blade rows.

16. An aircraft engine as recited in claim 13 wherein said engine includes unducted propulsor blade rows.

17. An aircraft engine as recited in claim 13 wherein said disk has a disk loading range of 30 horsepower per square foot and higher.

18. A wing mounted pusher aircraft engine comprising:

a plurality of propulsor blades which define an engine disk;

a wake interaction zone on said disk for a cruise flight condition wherein the wake from the aricraft's wing sheds on said disk;

a zone midline which is normal to and bisected by a radius of said disk, wherein said midline defines the radial location of said zone; and wherein the relative strength of the dynamic loads acting on said blades is a function of said radial location and may be expressed in a form normalized by said disk radius in a range from 0 to 1 wherein 0 corresponds to a location at the centerline and 1 corresponds to a location at the blade tip, and wherein said function is a maxima at 0 and has at least one relative minima between 0 and 1, and said location is such that he value of aid function is essentially a relative minima and wherein said disk is positioned relative to the wing wake such that for at least one predetermined operating condition the radial location of said midline is about 0.6 of the propulsor blade length.

19. A wing mounted pusher aircraft engine comprising:

a plurality of propulsor blades which define an engine disk;

a wake interaction zone on said disk wherein the wake from the aricraft's wing sheds on said disk;

a zone midline which is normal to and bisected by a radius of said disk, wherein said midline defines the radial location of said zone; and wherein said disk is positioned relative to the wing such that for at least one predetermined operating condition the radial location of said midline is about 0.6 of the propulsor blade length.

20. An aircraft engine comprising:

a plurality of propulsor blades which define an engine disk;

for a cruise flight condition, a wake interaction zone having a radial location on said disk wherein a wing wake sheds on said disk;

a central angle between blade positions at which said blades experience maximum dynamic loads due to said wing wake shedding on said disk as said blades rotate; and said central angle being about 90 degrees.

21. An aircraft engine as recited in claim 20 wherein said engine has a bypass ratio of 30 or greater.

22. An aircraft engine as recited in claim 20 wherein said engine includes counterrotating propulsor blade rows.

23. An aircraft engine as recited in claim 20 wherein said engine includes unducted counterrotating propulsor blade rows.

24. An aircraft engine as recited in claim 20 wherein said disk has a disk loading range of 30 horsepower per square foot and higher.

25. An aircraft engine comprising:

a plurality of propulsor blades which define an engine disk;

for a cruise flight condition, a wake interaction zone on said disk wherein a wake sheds on said disk producing a 2 per rev excitation of said blades;

a zone midline which is normal to and bisected by a radius of said disk, wherein said midline defines the radial location of said zone; and wherein the relative strength of the dynamic loads acting on said blades is a function of said radial location and may be expressed in a form normalized by said disk radius in a range from 0 to 1 wherein 0 corresponds to a location at the centerline and 1 corresponds to a location at the blade tip, and wherein said function is a maxima at zero and has at least one relative minima between 0 and 1, and said location for said cruise flight condition is such that he value of said function is essentially a relative minima and has a normalized value of about 0.6.

26. An aircraft engine comprising:

a plurality of propulsor blades which define an engine disk;

a wake interaction zone on said disk wherein a wake sheds on said disk;

a zone midline which is normal to and bisected by a radius of said disk, wherein said midline defines the radial location of said zone; and wherein said disk is positioned such that for at least one predetermined operating condition the radial location of said midline is about 0.6 of the propulsor blade length.

* * * * *